United States Patent
Tsuchiya et al.

(10) Patent No.: US 8,369,024 B2
(45) Date of Patent: Feb. 5, 2013

(54) LENS DRIVING DEVICE AND ELECTRONIC DEVICE

(75) Inventors: Tadashi Tsuchiya, Chiba (JP); Takayuki Satodate, Chiba (JP)

(73) Assignee: Seiko Instruments Inc. (JP)

( * ) Notice: Subject to any disclaimer, the term of this patent is extended or adjusted under 35 U.S.C. 154(b) by 187 days.

(21) Appl. No.: 12/734,155

(22) PCT Filed: Oct. 16, 2008

(86) PCT No.: PCT/JP2008/068795
§ 371 (c)(1), (2), (4) Date: Jul. 6, 2010

(87) PCT Pub. No.: WO2009/051202
PCT Pub. Date: Apr. 23, 2009

(65) Prior Publication Data
US 2010/0321804 A1    Dec. 23, 2010

(30) Foreign Application Priority Data

Oct. 17, 2007  (JP) ................................ 2007-270015

(51) Int. Cl.
*G02B 15/14* (2006.01)
(52) U.S. Cl. ...................................................... 359/696
(58) Field of Classification Search .................. 359/694, 359/696, 704, 824
See application file for complete search history.

(56) References Cited

FOREIGN PATENT DOCUMENTS
JP          2006-259116     *  9/2006

OTHER PUBLICATIONS

Patent Abstracts of Japan, publication No. 2002-296480, publication date Oct. 9, 2002.
Patent Abstracts of Japan, publication No. 04-256910, publication date Sep. 11, 1992.
Patent Abstracts of Japan, publication No. 09-252566, publication date Sep. 22, 1997.
Patent Abstracts of Japan, publication No. 2006-197754, publication date Jul. 27, 2006.

* cited by examiner

*Primary Examiner* — Joseph P Martinez
(74) *Attorney, Agent, or Firm* — Adams & Wilks

(57) ABSTRACT

A lens driving device includes a movable system having a lens frame to which a lens is fixed, and a fixation system including a guide shaft inserted into a guide hole formed in the lens frame to allow the lens frame to advance and retract in an optical axis direction and a restricting member for restricting rotation of the lens frame about the guide shaft. A lead screw is rotatable with respect to the fixation system about its axis which extends substantially parallel to the guide shaft, and the lead screw is threadedly fitted to the movable system. A motor rotates the lead screw to allow the movable system to advance and retract along the lead screw. A biasing spring is arranged substantially parallel to the guide shaft and biases the lens frame in both the axial direction and a direction orthogonal to the axial direction.

16 Claims, 19 Drawing Sheets

LENS DRIVING DEVICE AND ELECTRONIC DEVICE

CROSS-REFERENCE TO RELATED APPLICATION

This application is a U.S. national stage application of International Application No. PCT/JP2008/068795, filed Oct. 16, 2008, claiming a priority date of Oct. 17, 2007, and published in a non-English language.

Technical Field

The present invention relates to a lens driving device for performing focusing, zooming, and the like of a digital camera, a camera-equipped cell phone, or a disk reading device, and to an electronic device provided with the lens driving device.

Background Art

Conventionally, the electronic device such as the digital camera, the camera-equipped cell phone, or the disk reading device generally uses the lens driving device for adjusting a lens position to thereby perform focusing, zooming, and the like. Such lens driving device includes: a lead screw rotated by a motor; a nut threadably fitted to the lead screw; a lens frame, which is in contact with the nut and is provided so as to advance and retract with respect to a guide shaft arranged in an optical axis direction, and to which a lens is fixed; and a biasing means for biasing the lens frame against the nut in the optical axis direction (for example, see Patent Documents 1 and 2). In this structure, by driving the motor to rotate the lead screw, the nut threadably fitted to the lead screw advances and retracts in the axial direction. Therefore, the lens frame which is in contact with the nut and biased by the biasing means can advance and retract together with the nut in the axial direction. As a result, it is possible to adjust a position of the lens fixed to the lens frame. Further, the nut is biased by the biasing means to thereby press the lead screw so that a backlash with respect to the lead screw generated in the nut in the axial direction is eliminated.

Further, there is proposed a structure of the lens driving device as described above, in which a biasing portion for biasing the nut toward the lead screw is provided and a biasing member has a function of applying a pressing force on the biasing portion so that the lead screw is threadably fitted into the nut (for example, see Patent Document 3). According to such lens driving device, the biasing member and the biasing portion provided in the nut bias the nut with respect to the lead screw in the direction orthogonal to the axial direction, and hence a satisfactory meshing state can be realized.

Further, there is proposed a structure of the lens driving device as described above, in which a guide bar parallel to the lead screw is further provided, and a rotation-stop portion engaged with the guide bar is provided to the nut (for example, see Patent Document 4). In such lens driving device, the rotation-stop portion is engaged with the guide bar to thereby restrict rotation of the lead screw about its axis. As a result, it is possible to eliminate the backlash to more smoothly advance and retract the nut.

Patent Document 1: Japanese Patent No. 3860719
Patent Document 2: JP 04-256910 A
Patent Document 3: JP 09-252566 A
Patent Document 4: JP 2006-197754 A However, the lens driving devices of Patent Documents 1 to 4 have a problem in that, even if the nut can advance and retract with respect to the lead screw without generating a backlash, the backlash with respect to the guide shaft is generated in the lens frame if the lens frame and the guide shaft for guiding the lens frame have a dimension error therebetween and the backlash causes decentering of the lens fixed to the lens frame.

In recent years, as the disk reading device in which the lens driving device is installed, one intended for a next-generation optical disk has been developed. In data reading of such next-generation disk, decentering of the lens is becoming a big problem. In this regard, there is a need for developing a lens driving device capable of accurately adjusting a lens position without increasing the number of components and the size thereof.

The present invention has been made in view of the above-mentioned circumstances, and it is an object of the present invention to provide a lens driving device which are capable of performing accurate position adjustment of the lens frame in the optical axis direction with the small number of components without causing decentering about the lens frame to which the lens is fixed, and an electronic device provided with the lens driving device.

SUMMARY OF THE INVENTION

In order to solve the above-mentioned problem, the present invention proposes the following means.

The present invention provides a lens drilling device, including: a movable system including a lens frame to which the lens is fixed; a fixation system including a guide shaft inserted into a guide hole formed in the lens frame to allow the lens frame to advance and retract in an optical axis direction and a restricting member for restricting rotation of the lens frame about the guide shaft; a lead screw, which is a substantially-shaft-like member rotatable with respect to the fixation system about an axis thereof substantially parallel to the guide shaft, and has an outer peripheral surface in which a male thread threadably fitted to the movable system is formed; a motor for rotating the lead screw about the axis thereof to allow the movable system to advance and retract along the lead screw; and a biasing member arranged in substantially parallel to the guide shaft, for biasing the lens frame in the axial direction and about an axis thereof.

In the lens driving device according to the present invention, when the motor is driven to rotate the lead screw about the axis thereof, the movable system threadably fitted to the lead screw moves along the lead screw. In this case, the lens frame is biased by the biasing member in the axial direction substantially parallel to the optical axis direction, and hence the movable system presses the lead screw in the axial direction. Therefore, the movable system is allowed by the rotation of the lead screw to advance and retract in the optical axis direction without generating a backlash. That is, while being restricted in rotation about the guide shaft by the restricting member, the lens frame of the movable system moves along the guide shaft in the optical axis direction. As a result, it is possible to accurately adjust in the optical axis direction the position of the lens fixed to the lens frame. In this case, the biasing member biases the lens frame in the axial direction as described above and also biases the lens frame about the axis thereof. Therefore, the lens frame always presses by the biasing member the guide shaft and the restricting member in the direction orthogonal to the optical axis direction. This prevents a backlash from being generated in the direction orthogonal to the optical axis direction to thereby enable position adjustment of the lens in the optical axis direction without causing decentering.

Further, it is more preferred that, in the lens driving device described above, the biasing member include a coil spring obtained by rolling a coil wire, and the coil wire have one end, which is engaged with the lens frame so that the coil wire does not rotate in a positive rotation direction about an axis thereof, and another end, which is engaged with one of the fixation system and a member so that the coil wire does not rotate in a negative rotation direction about the axis thereof, the member being restricted in rotation with respect to the fixation system about an axis thereof substantially parallel to an optical axis.

In the lens driving device according to the present invention, the coil wire constituting the coil spring has the one end, which is engaged with the lens frame so that the coil wire does not rotate in the positive rotation direction about the axis thereof, and the another end, which is engaged with one of the fixation system and the member which is restricted in rotation with respect to the fixation system so that the coil wire does not rotate in a negative rotation direction about the axis thereof. Therefore, the lens frame is biased by the coil spring with respect to the fixation system about the axis thereof, and the guide shaft and the restricting member serving as the fixation system are pressed in the direction orthogonal to the optical axis direction.

Further, it is more preferred that, in the lens driving device described above, the movable system include the lens frame and a nut, which is arranged so as to be adjacent to the lens frame in a direction of the guide shaft, and in which a screw hole to be threadably fitted to the lead screw is formed, and the lens frame press the nut by biasing in the axial direction performed by the biasing member.

In the lens driving device according to the present invention, the biasing member causes the lens frame to press the nut. Therefore, along with the movement of the nut caused by the rotation of the lead screw, the lens frame can move so as to follow the movement. Further, the biasing of the lens frame in the axial direction performed by the biasing member acts also on the nut, and hence it is possible to eliminate the backlash of the nut with respect to the lead screw.

Further, an electronic device of the present invention includes the above-mentioned lens driving device.

According to the electronic device of the present invention, the lens driving device installed therein enables the accurate position adjustment of the lens in the optical axis direction without causing decentering.

DETAIL DESCRIPTION OF THE INVENTION (First Embodiment)

FIGS. 1 to 5 illustrate a lens driving device according to a first embodiment of the present invention. The lens driving device is installed in an electronic device such as a camera, a camera-equipped cell phone, or a disk reading device, and adjusts a position of a lens, which is used for photographing and data reading, in an optical axis direction so as to adjust a focus position and the like.

Figure 1:
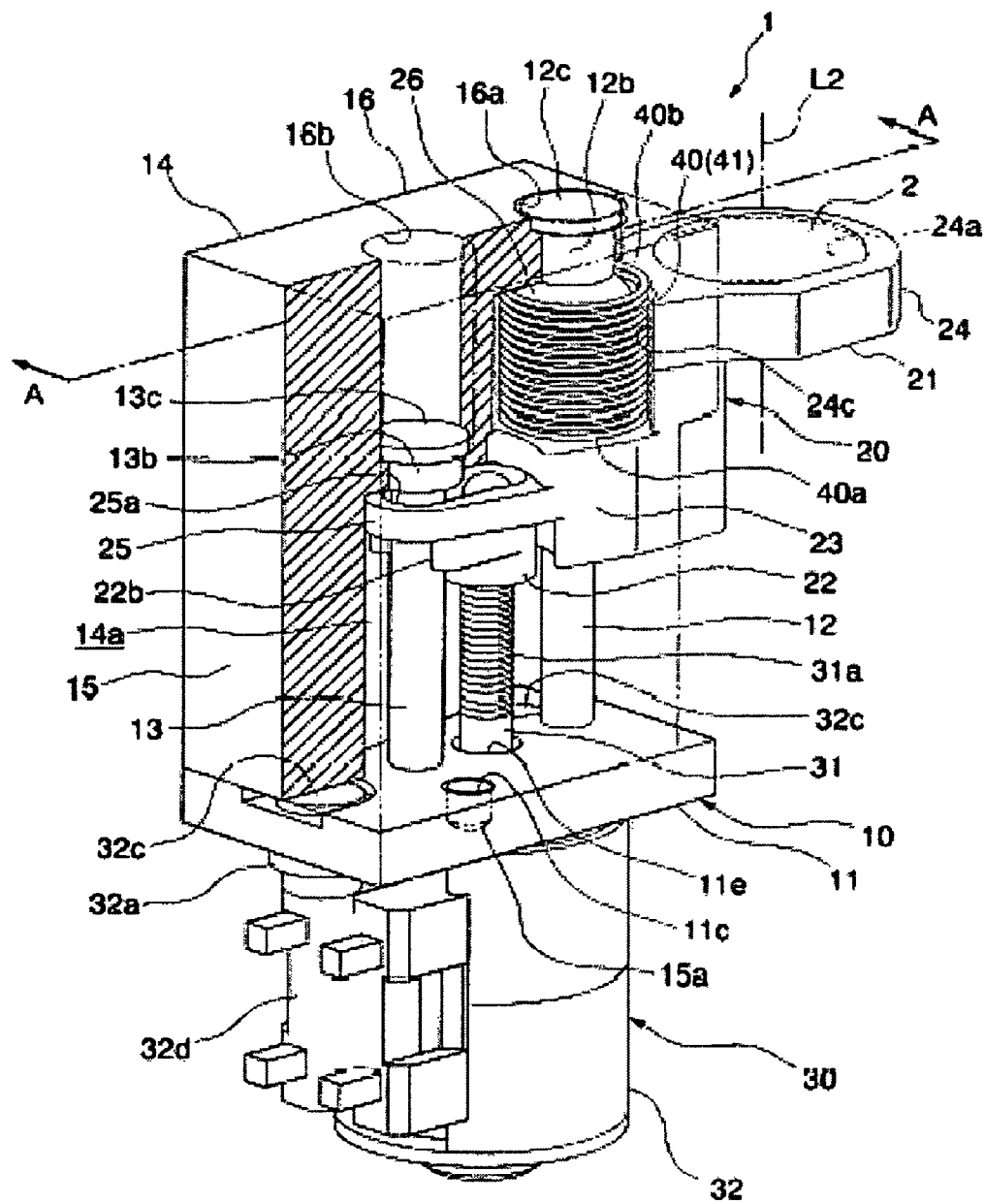
FIG. 1 A partially-cutaway perspective view of a lens driving device according to a first embodiment of the present invention.

As illustrated in FIG. 1, the lens driving device 1 according to this embodiment mainly includes: a fixation system 10 including a guide shaft 12 arranged in substantially parallel to an optical axis L2 of a lens 2; a movable system 20, which includes a lens frame 21 to which the lens 2 is fixed and is movable with respect to the fixation system 10; a driving system 30 for moving the movable system 20; and a coil spring 40 serving as a biasing member for biasing the lens frame 21 of the movable system 20. Each of the components is described in detail below.

First, details of the fixation system 10 are described. As illustrated in FIGS. 1 to 4, the fixation system 10 includes: a substantially-plate-shaped bottom plate 11; the guide shaft 12 extending from the bottom plate 11 so as to be substantially parallel to the optical axis L2 of the lens 2; a rotation-restricting shaft 13 serving as a restricting member; and a substantially-box-shaped case 14 formed on the bottom plate 11 so as to cover the guide shaft 12 and the rotation-restricting shaft 13. In the bottom plate 11, a fixation through-hole 11a for the guide shaft 12 and a fixation through-hole 11b for the rotation-restricting shaft 13.

Further, the case 14 includes a wall portion 15 provided upright from the bottom plate 11 and a top plate portion 16 extending from the wall portion 15 to be opposed to the bottom plate 11. The wall portion 15, the top plate portion 16, and the bottom plate 11 constitute a housing portion 14a for housing the movable system 20, and an opening portion 14b through which the lens frame 21 in the movable system 20 is projected from the housing portion 14a to the outside. In the wall portion 15, positioning protrusions 15a are formed on a surface in contact with the bottom plate 11. When the case 14 and the bottom plate 11 are assembled together, the positioning protrusions 15a fit into recesses 11c formed in the bottom plate 11 to thereby fix the position of the case 14 with respect to the bottom plate 11. In the top plate portion 16, there are formed through-holes 16a and 16b, which are provided at positions opposed to the fixation through-holes 11a and 11b of the bottom plate 11, respectively, so as to communicate thereto.

Further, in the guide shaft 12, one end thereof is fixed to the bottom plate 11, and another end thereof has an increased-diameter portion 12b whose diameter is larger than that of the one end. In addition, the another end is provided with a flange portion 12c extending like a brim to the radially-outer side. Similarly, in the rotation-restricting shaft 13, one end thereof is fixed to the bottom plate 11, and another end thereof has an increased-diameter portion 13b whose diameter is larger than that of the one end. In addition, the another end is provided with a flange portion 13c stretching like a brim to the radially-outer side.

Further, the guide shaft 12 and the rotation-restricting shaft 13 are inserted into the through-holes 16a and 16b of the top plate portion 16 of the case 14, respectively. Further, one ends of the guide shaft 12 and the rotation-restricting shaft 13 are press-fitted, as press-fitted portions 12a and 13a, into the corresponding fixation through-holes 11a and 11b of the bottom plate 11, respectively, so as to be fixed thereto. In the press-fitted state, the flanges 12c and 13c of the guide shaft 12 and the rotation-restricting shaft 13 are engaged with step portions formed in the through-holes 16a and 16b of the top plate portion 16 of the case 14, respectively. As a result, the bottom plate 11, the case 14, the guide shaft 12, and the rotation-restricting shaft 13 are integrated together.

Next, details of the driving system 30 are described. As illustrated in FIGS. 1 to 4, the driving system 30 has a lead screw 31 arranged in substantially parallel to the guide shaft 12, and a motor 32 for rotating the lead screw 31 about its own axis. The motor 32 has, on one end side thereof, a fixation plate 32a to be fixed to the fixation system 10. Further, fixation screws 32c are inserted into through-holes 11d formed in the bottom plate 11, and then threadably fitted into screw holes 32b formed in the fixation plate 32a. As a result, the motor 32 is fixed to the bottom plate 11 on the side opposite to the case 14. In this embodiment, the lead screw 31 constitutes a part of the motor shaft, and is inserted into a through-hole 11e formed in the bottom plate 11 to thereby project toward the housing portion 14a. On an outer peripheral surface of the lead screw 31 projecting in the housing portion 14a, a male thread 31a is formed. Note that a fixation member 32d is provided on a side surface of the motor 32, and the fixation member 32d can be fixed to a casing or the like of the electronic device in which the lens driving device is installed.

Next, details of the movable system 20 are described. As illustrated in FIGS. 1 to 4, the movable system 20 includes the above-mentioned lens frame 21 to which the lens 2 is fixed and a nut 22 threadably fitted to the lead screw 31. The lens frame 21 includes a guide portion 23 in which a guide hole 23a into which the guide shaft 12 is inserted is formed, a fixation portion 24, which projects from the guide portion 23 to the outside, and to which the lens 2 is fixed, and an engaging portion 25, which extends from the guide portion 23 to thereby be engaged with the rotation-restricting shaft 13. The fixation portion 24 is provided with an attachment hole 24a coaxially with the optical axis L2, and the lens 2 is fitted into and fixed to the attachment hole 24a.

On the guide portion 23, there is projected a substantially-cylindrical spring-winding portion 26 around which a coil spring 40 serving as a biasing member is wound. Further, the guide hole 23a into which the guide shaft 12 is inserted is formed coaxially with the spring-winding portion 26 so as to communicate to the guide portion 23 and the spring-winding portion 26. Further, an end surface 24b of the fixation portion 24 opposed to the spring-winding portion 26 is formed into a recessed-surface shape correspondingly to the outer-peripheral-surface-shape of the spring-winding portion 26, and engagement protrusions 24c are formed on both ends of the end surface 24b. Further, in the engaging portion 25, an elongated hole 25a into which the lead screw 31 and the rotation-restricting shaft 13 are inserted is formed. The opening width of the elongated hole 25a is set to be larger than the outer diameter of the lead screw 31 in a region in which the lead screw 31 is inserted, and is set to be substantially equal to the outer diameter of the rotation-restricting shaft 13 in a region in which the rotation-restricting shaft 13 is inserted.

Further, in the nut 22, there are formed a screw hole 22a to be threadably fitted to the lead screw 31 and a guide groove 22b into which the rotation-restricting shaft 13 is inserted. The screw hole 22a and the guide groove 22b are arranged so as to be in contact with each other and be adjacent to the engaging portion 25 of the lens frame 21 in the axial direction. Further, the width of the guide groove 22b is set so as to be substantially equal to the outer diameter of the rotation-restricting shaft 13.

Next, details of the coil spring 40 serving as a biasing member are described. As illustrated in FIGS. 1 to 4, the coil spring 40 is wound around the spring-winding portion 26, one end portion 40a comes in contact with the guide portion 23 of the lens frame 21, and another end portion 40b comes in contact with the top plate portion 16 of the case 14. Therefore, the coil spring 40 is set so as to be compressed between the guide portion 23 of the lens frame 21 and the top plate portion 16 of the case 14 irrespective of the position of the lens frame 21 in the optical axis L2 direction. As a result, the coil spring 40 biases the lens frame 21 toward the nut 22 in its axial direction to thereby press the lens frame 21 and the nut 22 to each other constantly.

Figure 5:
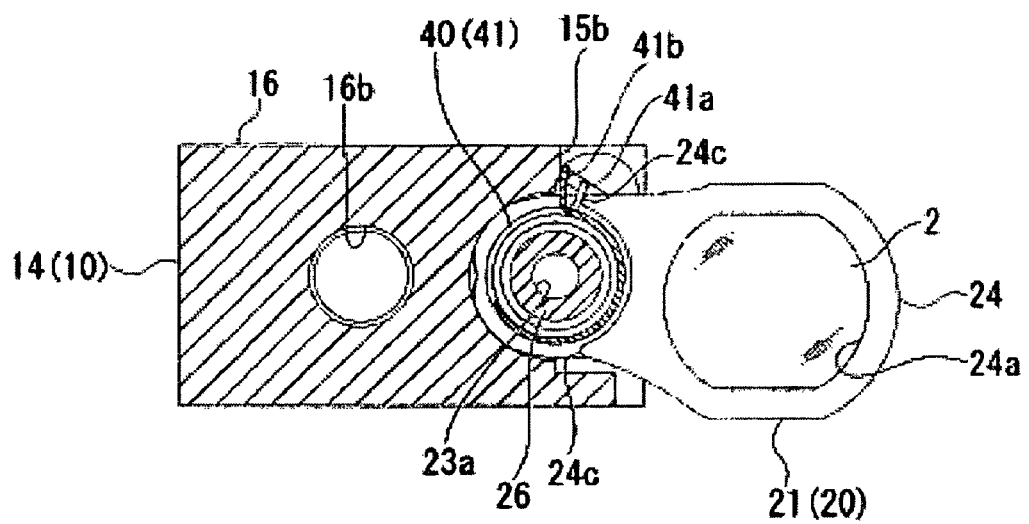
FIG. 5 A sectional view taken along the line B-B of FIG. 2.

Further, the coil spring 40 is formed by rolling a coil wire 41. One end 41a and another end 41b of the coil wire 41 respectively corresponding to the one end portion 40a and the another end portion 40b of the coil spring 40 project to the radially-outer side. Further, as illustrated in FIG. 5, the one end 41a of the coil wire 41 is engaged with one of the engagement protrusions 24c of the fixation portion 24 of the lens frame 21 serving as the movable system 20 so that the coil wire 41 does not rotate in the positive rotation direction about its own axis. Further, the another end 41b of the coil wire 41 is engaged with an end surface 15b of the wall portion 15 of the case 14 serving as the fixation system 10 so that the coil wire 41 does not rotate in the negative rotation direction about its own axis. Here, the coil wire 41 constituting the coil spring 40 is engaged with the engagement protrusion 24c of the lens frame 21 and the end surface 15b of the case 14 with a circumferential space between the one end 41a and the another end 41b being elastically reduced. Therefore, the coil spring 40 biases the lens frame 21 in the negative rotation direction about its own axis.

Figure 2:
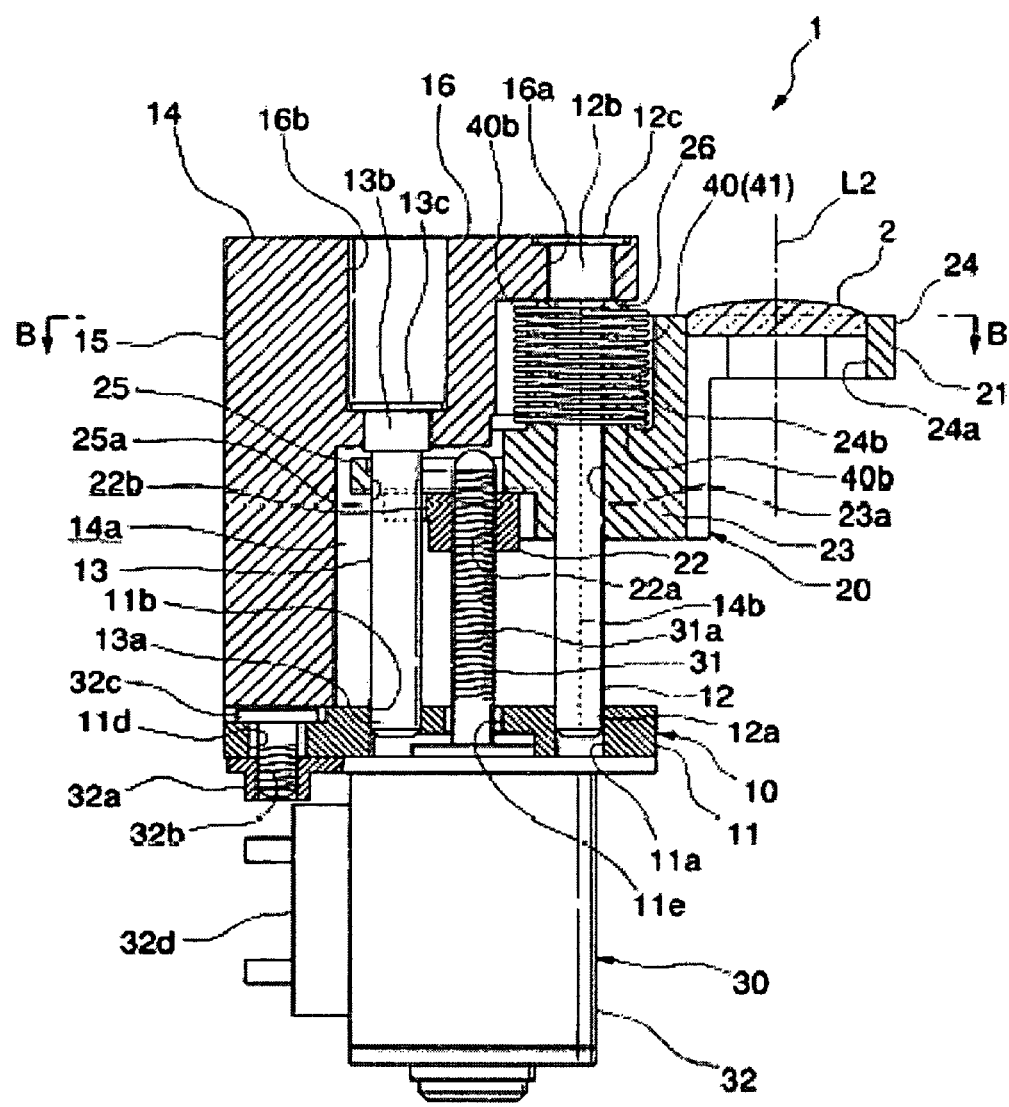
FIG. 2 A sectional view taken along the line A-A of FIG. 1.
Figure 3:
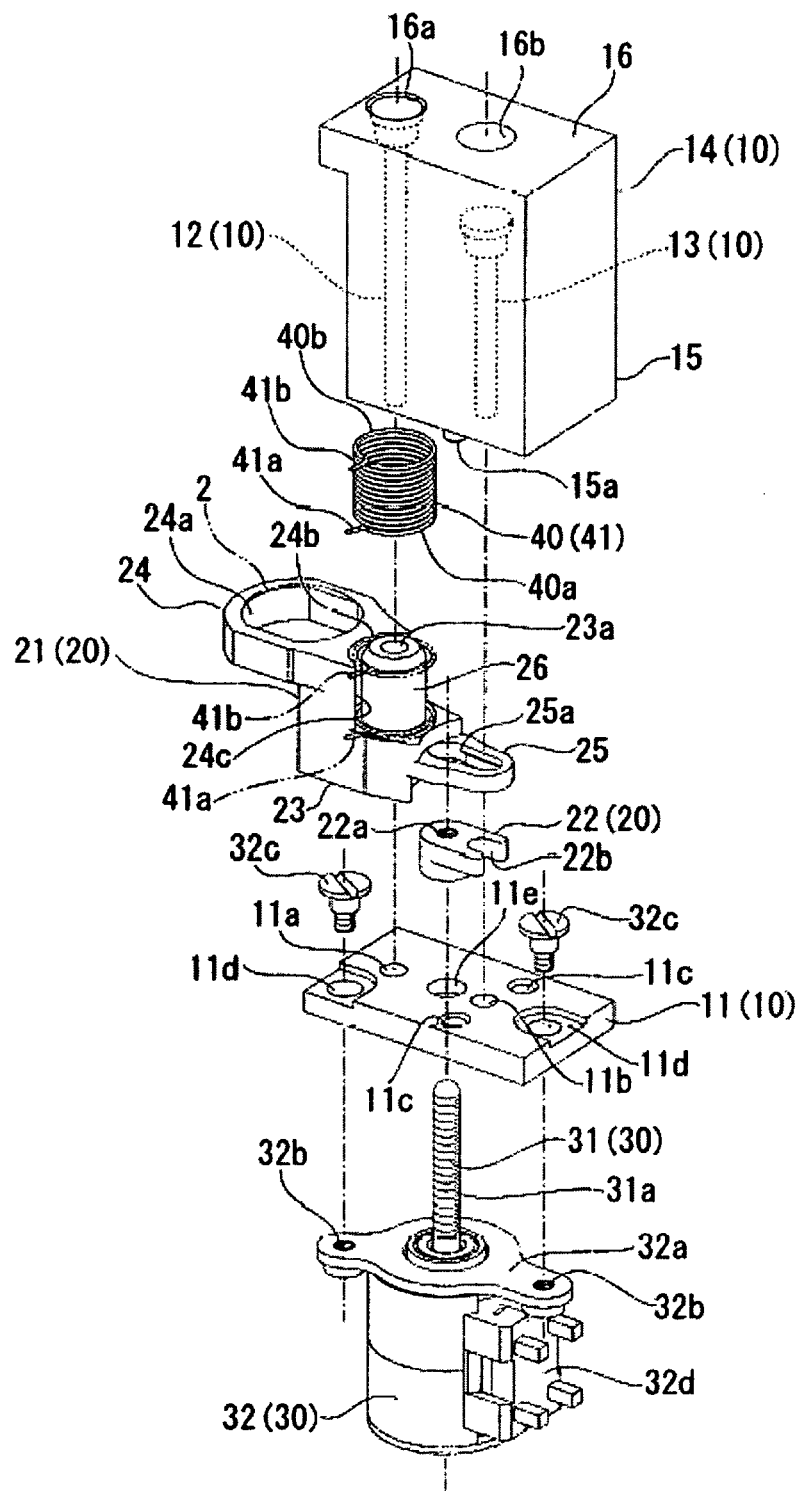
FIG. 3 An exploded perspective view of the lens driving device according to the first embodiment of the present invention.
Figure 4:
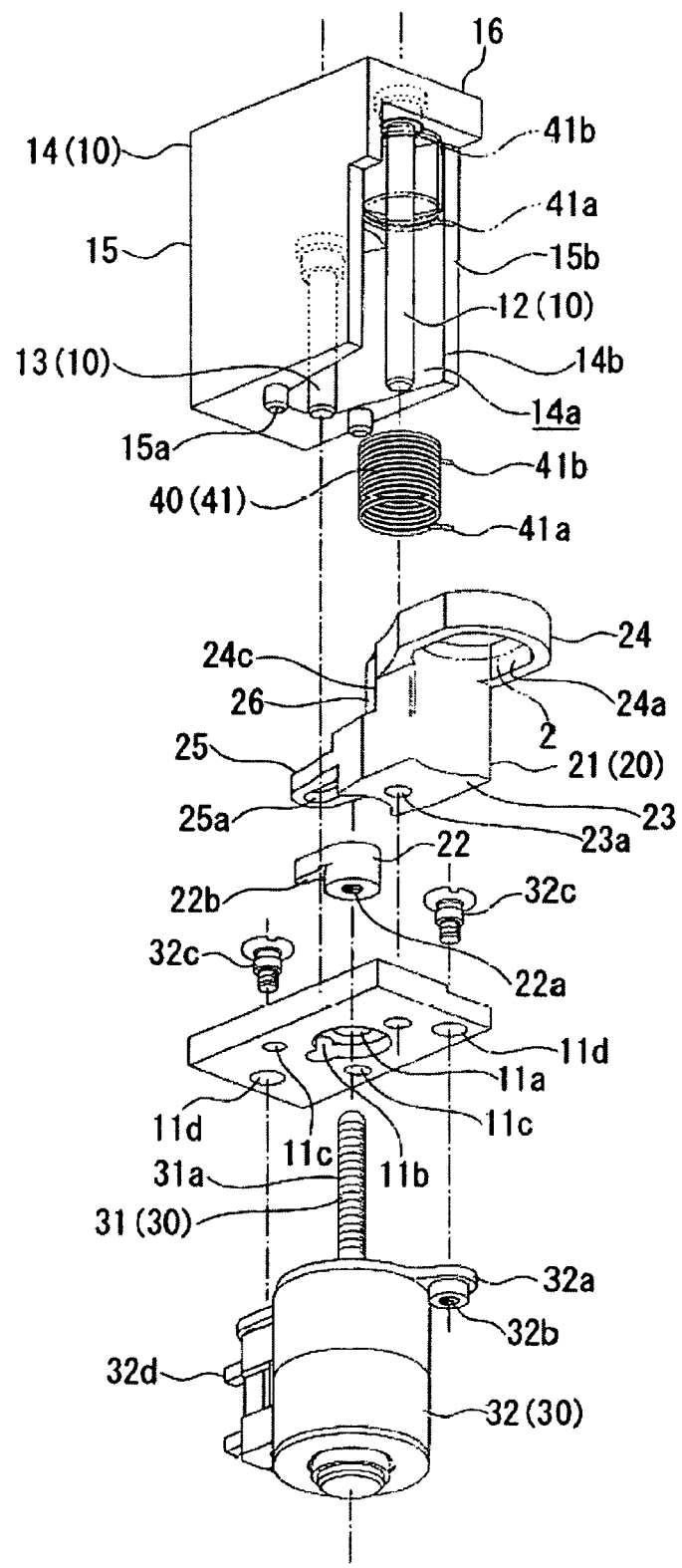
FIG. 4 Another exploded perspective view of the lens driving device according to the first embodiment of the present invention.

Next, operations of the lens driving device 1 according to this embodiment are described. As illustrated in FIGS. 1 and 2, in order to adjust the position of the lens 2 in the optical axis L2 direction, it is required to drive the motor 32 to rotate the lead screw 31 in any one of the positive and negative directions about its axis. In the nut 22 threadably fitted to the male thread 31a of the lead screw 31, the guide groove 22b is engaged with the rotation-restricting shaft 13 arranged in substantially parallel to the lead screw 31. Therefore, the nut 22 can advance and retract in the axial direction of the lead screw 31, and is restricted in rotation about the axis of the lead screw 31. Therefore, the nut 22 advances and retracts in the axial direction along with the rotation of the lead screw 31.

In this case, the lens frame 21 is biased by the coil spring 40 in the axial direction to thereby press the nut 22. Therefore, along with the movement of the nut 22 in the axial direction, the lens frame 21 can advance and retract so as to follow the movement. Further, the biasing in the axial direction performed by the coil spring 40 is transmitted to the nut 22, and the nut 22 presses the lead screw 31 in the axial direction and is positioned on one side of the lead screw 31. Therefore, the nut 22 can advance and retract in the axial direction along with the rotation of the lead screw 31 without generating a backlash in the axial direction. Therefore, the lens frame 21 in contact with the nut 22 moves along the guide shaft 12 in the optical axis L2 direction while the rotation about the guide shaft 12 is restricted by the rotation-restricting shaft 13. Therefore, the position of the lens 2 fixed to the lens frame 21 can be accurately adjusted in the optical axis L2 direction.

In this case, the coil spring 40 also biases the lens frame 21 about its axis, and the lens frame 21 is restricted in rotation about the guide shaft 12 by the rotation-restricting shaft 13. Therefore, the lens frame 21 always presses by the coil spring 40 the guide shaft 12 and the rotation-restricting shaft 13 in the direction orthogonal to the optical axis L2 direction. This prevents a backlash from being generated in the direction orthogonal to the optical axis L2 direction to thereby enable position adjustment in the optical axis L2 direction of the lens 2 without causing decentering.

As described above, in the lens driving device 1 according to this embodiment, the lens frame 21 can be biased only by the coil spring 40 in the axial direction and about its axis. As a result, it is possible to accurately adjust the position of the lens frame 21 to which the lens 2 is fixed in the optical axis L2 direction with use of the minimum number of components without causing decentering.

Note that, though this embodiment adopts, as the coil spring 40 serving as the biasing member, one which is sandwiched between the top plate portion 16 of the case 14 and the guide portion 23 of the lens frame 21 so as to be compressed, the coil spring 40 is not limited thereto. For example, it is possible to adopt one which is fixed between and to the bottom plate 11 and the guide portion 23 of the lens frame 21 so as to be kept being stretched and is arranged so as to be kept in a state in which twisting deformation about its axis occurs. Also in this manner, similarly, it is possible to bias the lens frame 21 in the axial direction and about its axis to thereby eliminate the backlash of the nut 22 and the decentering of the lens 2.

Figure 6:
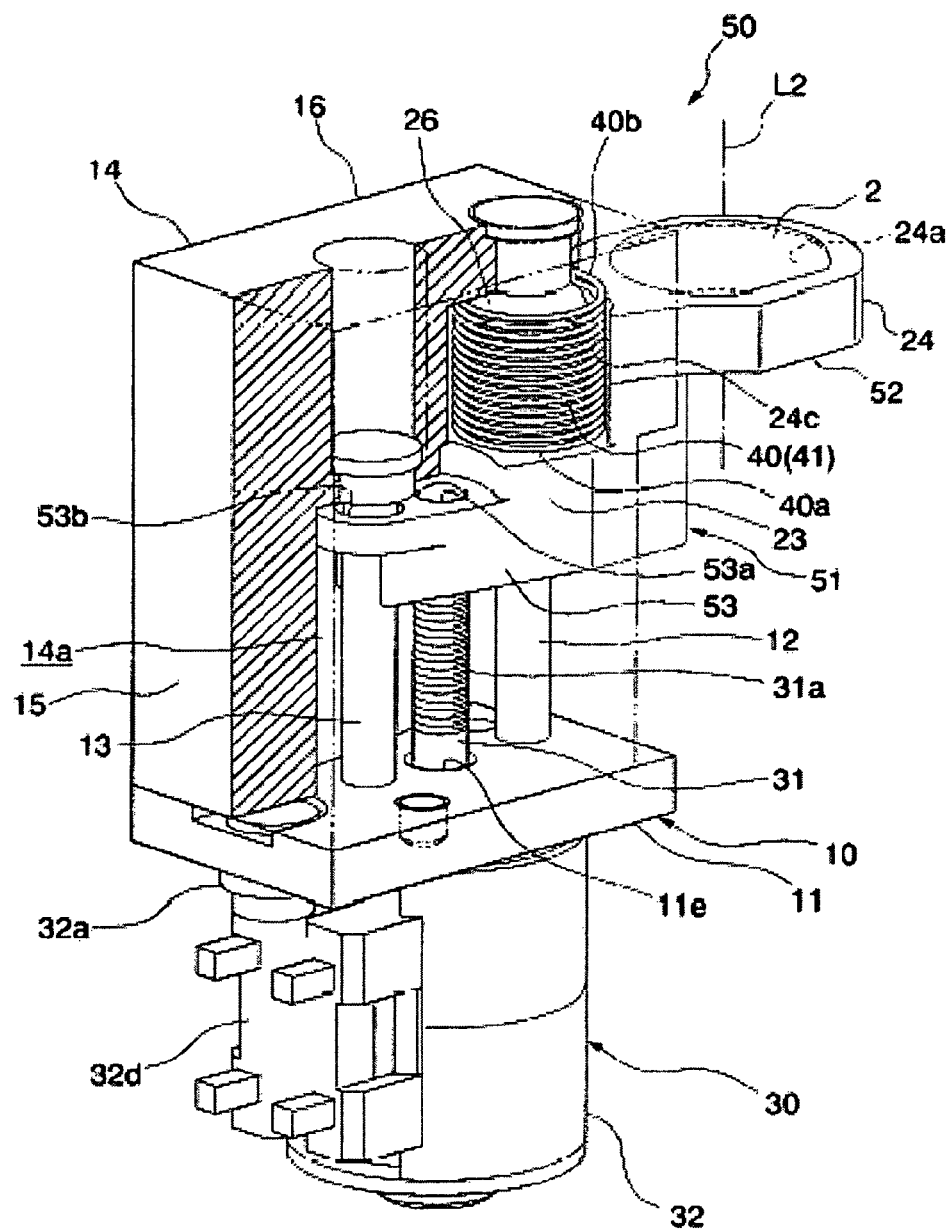
FIG. 6 A partially-cutaway perspective view of a lens driving device of a modification of the first embodiment of the present invention.
Figure 7:
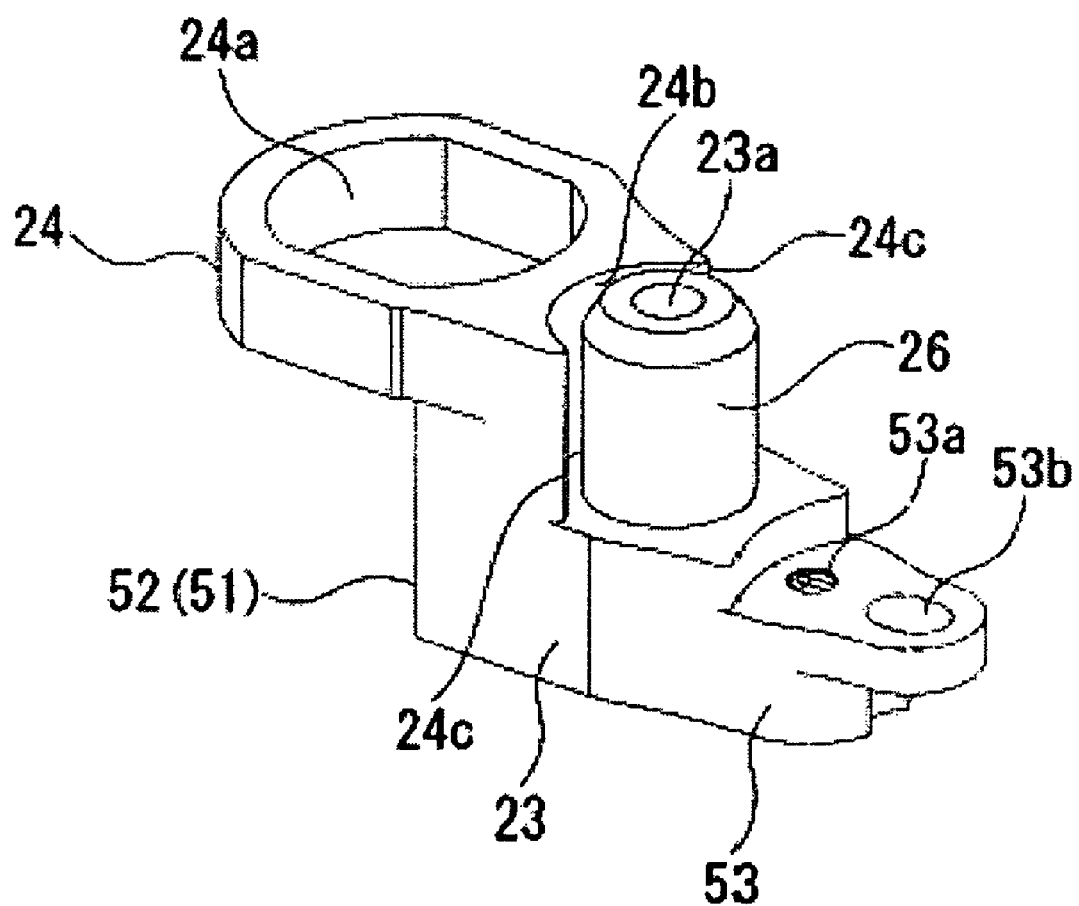
FIG. 7 A perspective view illustrating details of a lens frame in the lens driving device of the modification of the first embodiment of the present invention.
Figure 8:
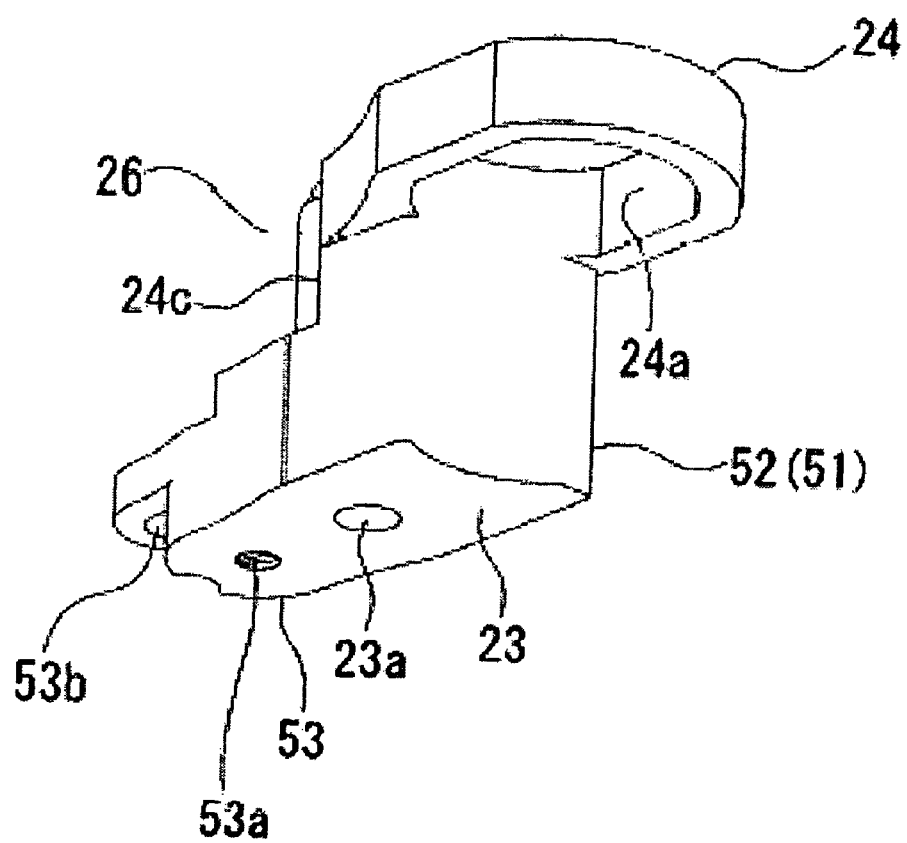
FIG. 8 Another perspective view illustrating details of the lens frame in the lens driving device of the modification of the first embodiment of the present invention.

Further, in the movable system 20, the lens frame 21 to which the lens 2 is fixed and the nut 22 threadably fitted to the lead screw 31 are provided separately from each other. However, the movable system 20 is not limited thereto. FIGS. 6 to 8 illustrate a modification of this embodiment. As illustrated in FIGS. 6 to 8, in the lens driving device 50 of this modification, a screw hole 53a into which the lead screw 31 is threadably fitted is formed in a lens frame 52 constituting a movable system 51. Specifically, the lens frame 52 includes the guide portion 23, the fixation portion 24, and a nut portion 53 extending from the fixation portion. In the nut portion 53, the screw hole 53a into which the lead screw 31 is threadably fitted is formed, and an engaging hole 53b into which the rotation-restricting shaft 13 is inserted is formed. The inner diameter of the engaging hole 53b is set to be substantially equal to the outer diameter of the rotation-restricting shaft 13. As a result, the lens frame 52 is restricted in rotation about the guide shaft 12.

Even when the lens frame and the nut have the integrated structure as described above, rotation of the lead screw 31 about its own axis allows the rotationally-restricted lens frame 52 to advance and retract in the optical axis L2 direction to thereby similarly prevent the backlash in the optical axis L2 direction and the direction orthogonal thereto from being generated by the coil spring 40.

(Second Embodiment)

Next, a second embodiment of the present invention is described. FIGS. 9 to 13 illustrate the second embodiment of the present invention. In this embodiment, the members which are the same as those used in the above-mentioned embodiment are denoted by the same reference symbols and the description thereof is omitted.

As illustrated in FIGS. 9 to 12, the lens driving device 60 of this embodiment includes the fixation system 10, the driving system 30, a lens frame 62 to which the lens 2 is fixed, a movable system 61 movable with respect to the fixation system 10, and a coil spring 70 serving as a biasing member for biasing the lens frame 62.

The movable system 61 includes the above-mentioned lens frame 62 and a first nut 63 and a second nut 64 threadably fitted to the lead screw 31. The lens frame 62 includes: a guide portion 65 in which a guide hole 65a, into which the guide shaft 12 is inserted, is formed; a fixation portion 24, which projects from the guide portion 65 to the outside, and to which the lens 2 is fixed; and the engaging portion 25 extending from the guide portion 65 so as to be engaged with the rotation-restricting shaft 13.

Further, in the first nut 63 and the second nut 64, there are respectively formed screw holes 63a and 64a threadably fitted to the lead screw 31, and guide grooves 63b and 64b into which the rotation-restricting shaft 13 is inserted. Further, widths of the guide grooves 63b and 64b are set to be substantially equal to the outer diameter of the rotation-restricting shaft 13. The first nut 63 is arranged on the side opposite to the side on which the coil spring 70 is arranged with respect to the lens frame 62 so that the first nut 63 comes in contact with the engaging portion 25 of the lens frame 62 in the axial direction. Further, the second nut 64 is arranged on the side on which the coil spring 70 is arranged with respect to the lens frame 62, and the coil spring 70 is sandwiched between the second nut 64 and the engaging portion 25 of the lens frame 62 in the axial direction to thereby be compressed.

Figure 9:
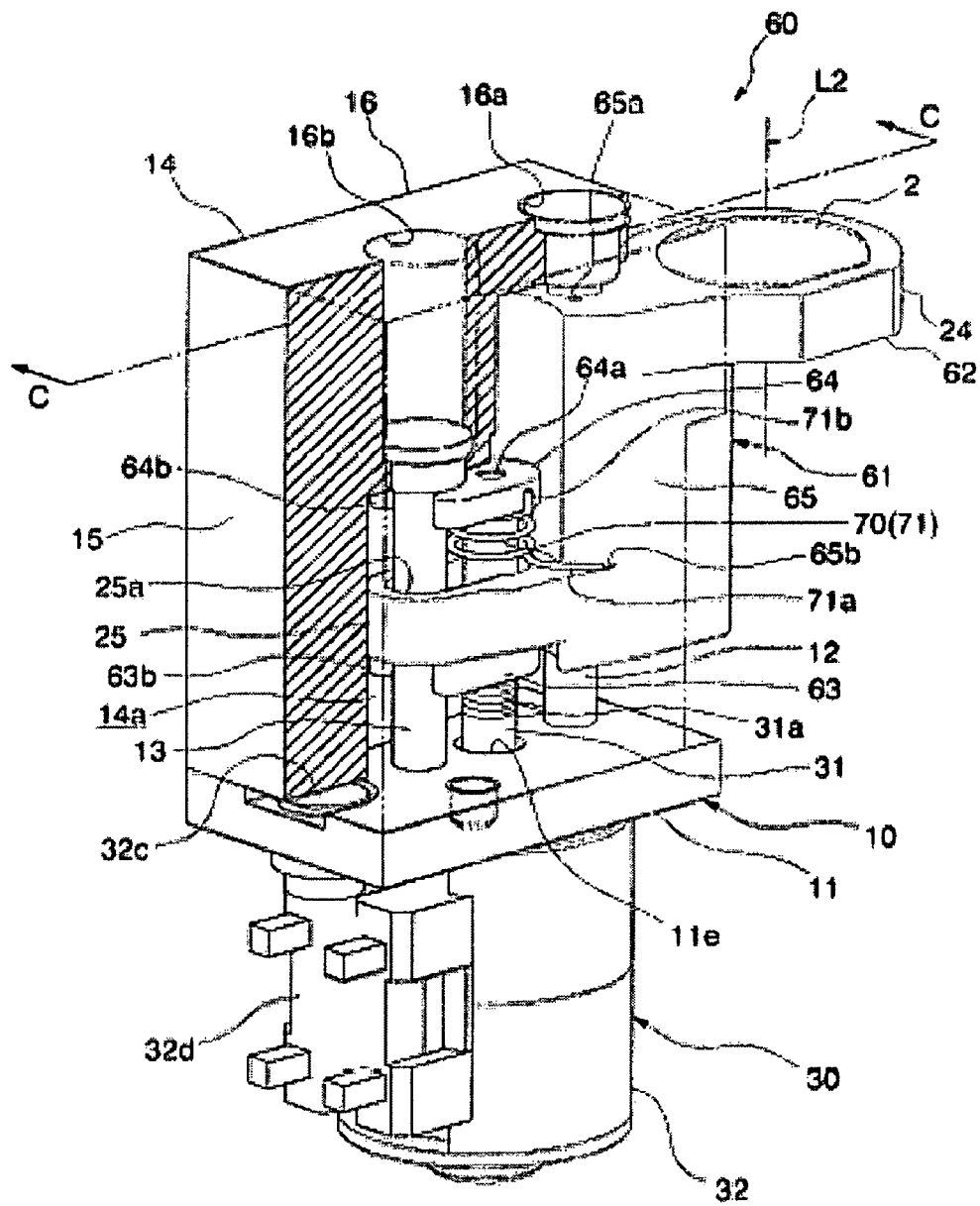
FIG. 9 A partially-cutaway perspective view of a lens driving device according to a second embodiment of the present invention.
Figure 13:
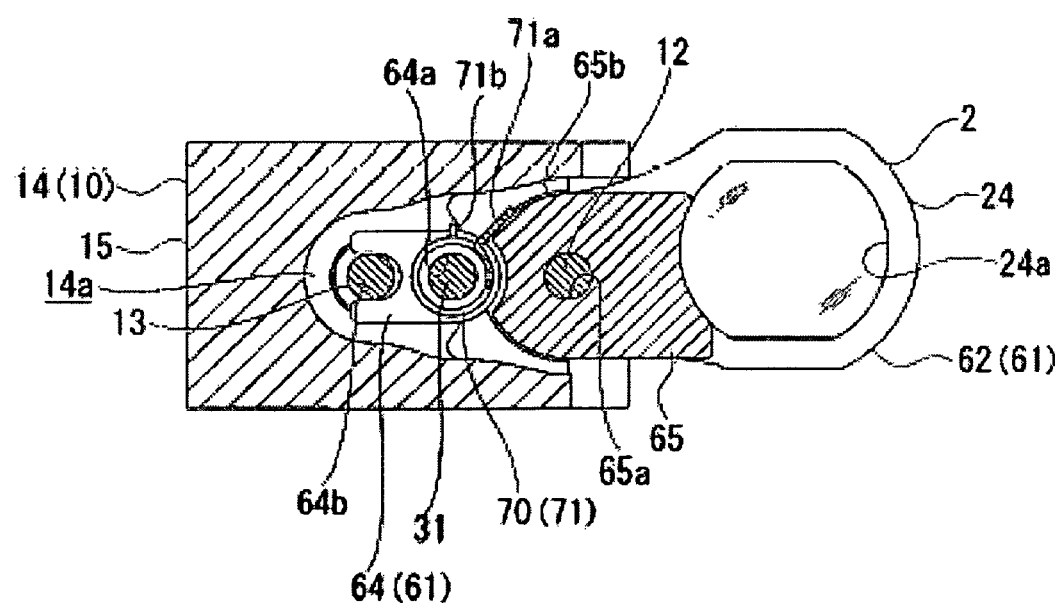
FIG. 13 A sectional view taken along the line D-D of FIG. 10.

Therefore, the coil spring 70 biases the lens frame 62 toward the first nut 63 in the direction of its own axis, and the lens frame 62 and the first nut 63 are always pressed against each other. Further, the coil spring 70 is formed by rolling a coil wire 71, and one end 71a on the side in contact with the engaging portion 25 of the lens frame 62 projects to the radially-outer side, and another end 71b on the side in contact with the second nut 64 projects to the axially-outer side. Further, as illustrated in FIGS. 9 and 13, the one end 71a of the coil wire 71 is engaged with a wall surface 65b of the guide portion 65 of the lens frame 62 serving as the movable system 61 so that the coil wire 71 does not rotate in the positive rotation direction about its own axis. Further, the another end 71b of the coil wire 71 is engaged with a side surface of the second nut 64 so that the coil wire 71 does not rotate in the negative rotation direction about its own axis. Further, similarly to the first embodiment, the coil spring 70 is engaged with the wall surface 65b of the guide portion 65 of the lens frame 62 and the wall surface of the second nut 64, respectively, with a circumferential space between the one end 71a and the another end 71b being elastically reduced. Here, by the rotation-restricting shaft 13 serving as the fixation system 10, the second nut 64 is restricted in rotation about its axis substantially parallel to the optical axis L2. Therefore, the coil spring 70 biases with respect to the fixation system 10 the lens frame 62 in the negative rotation direction about its own axis.

Next, operations of the lens driving device 60 according to this embodiment are described.

Figure 10:
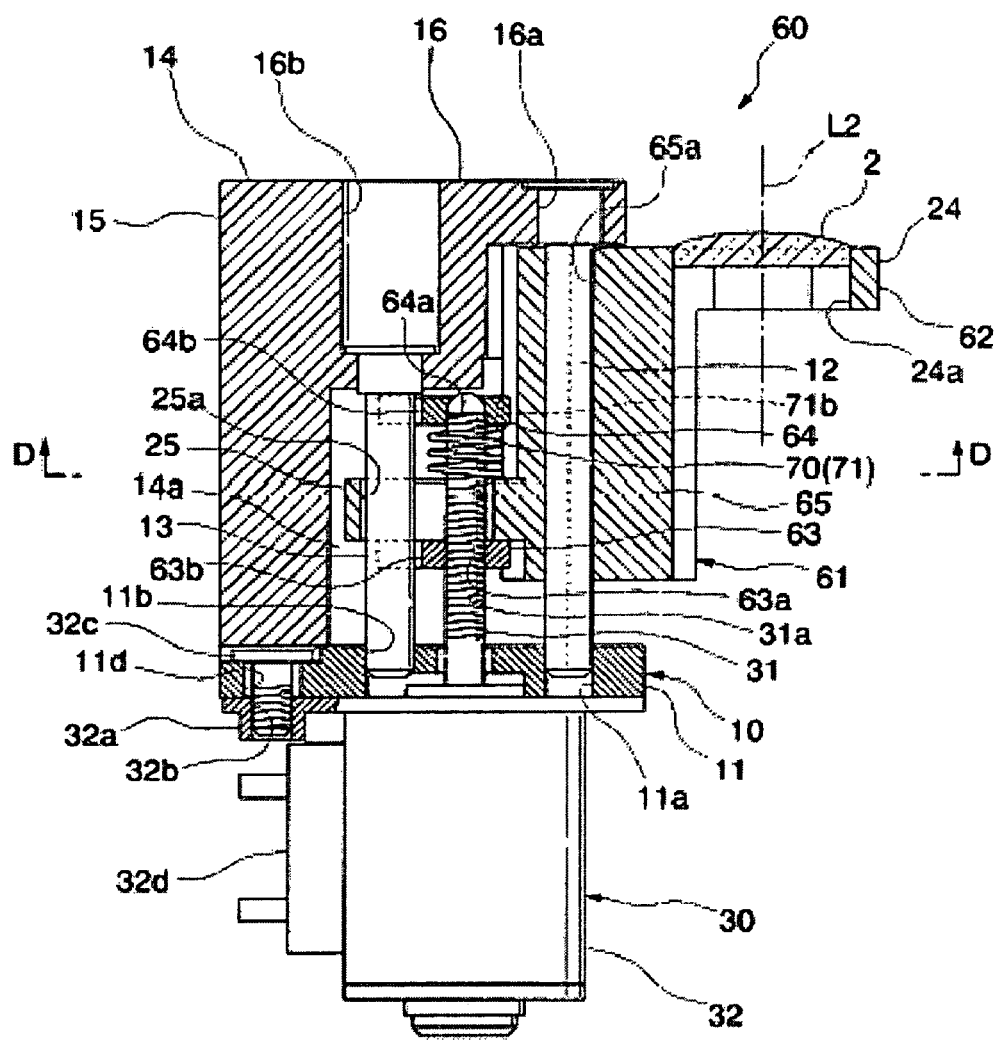
FIG. 10 A sectional view taken along the line C-C of FIG. 9.
Figure 11:
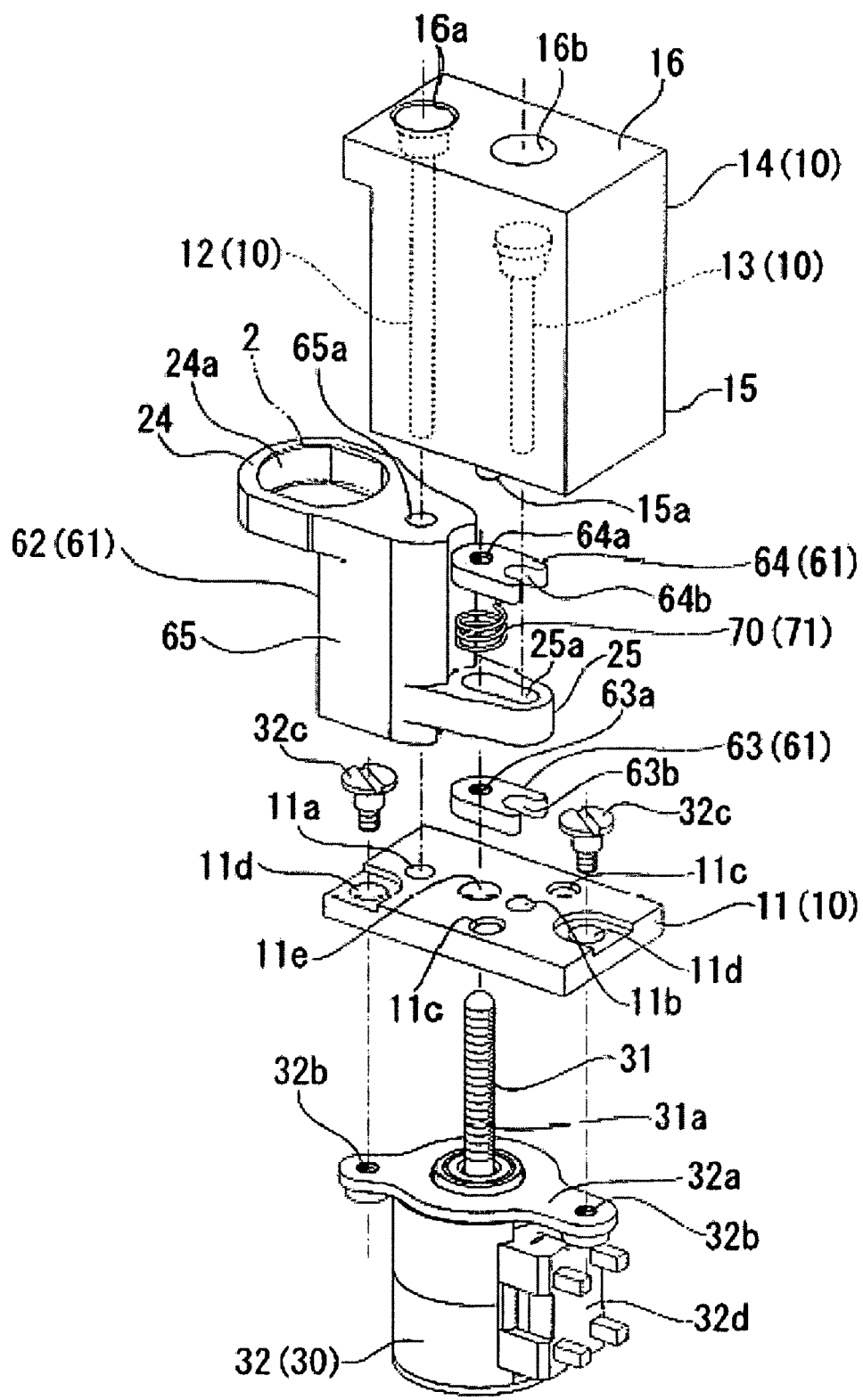
FIG. 11 An exploded perspective view of the lens driving device according to the second embodiment of the present invention.
Figure 12:
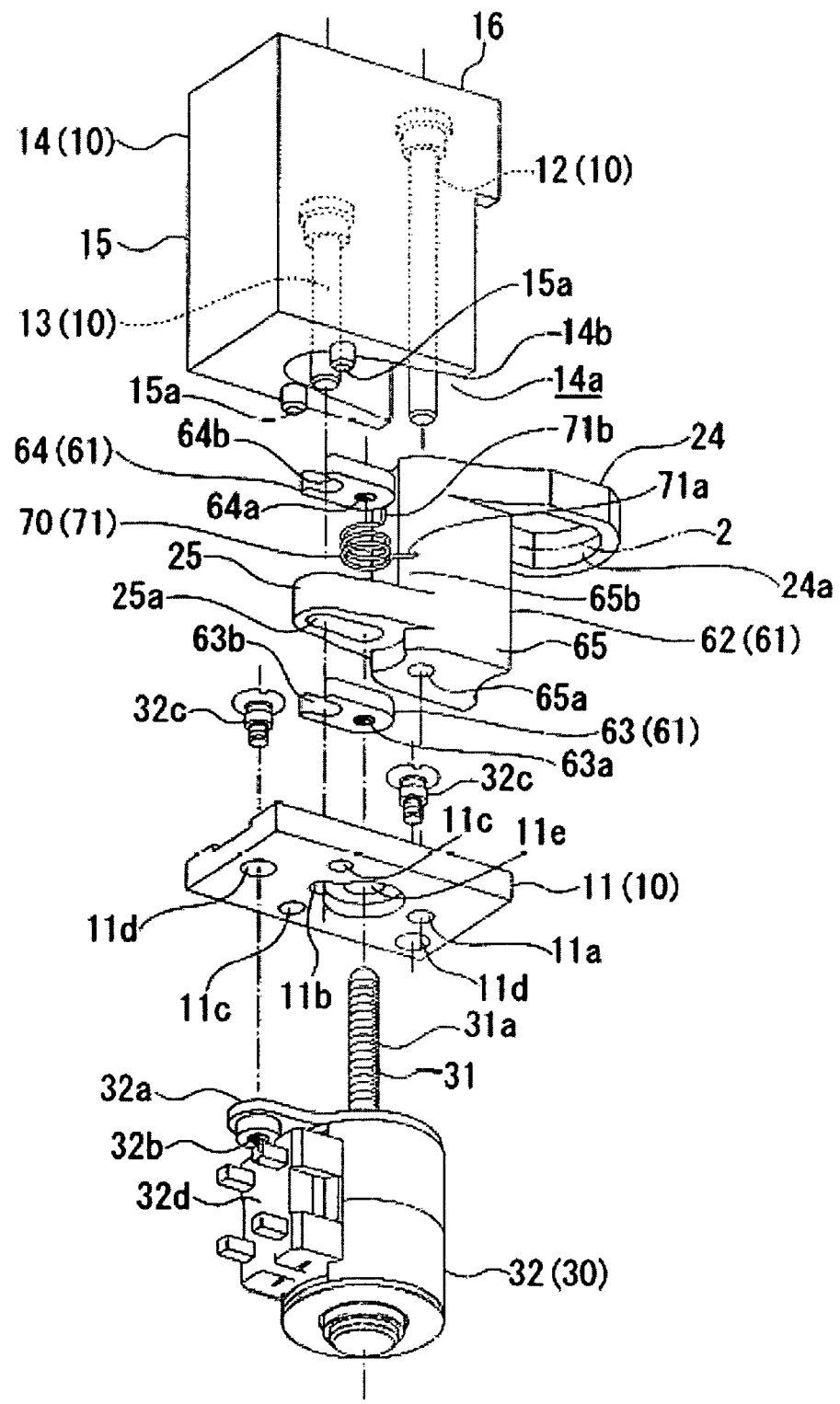
FIG. 12 Another exploded perspective view of the lens driving device according to the second embodiment of the present invention.

As illustrated in FIGS. 9 and 10, in order to adjust the position of the lens 2 in the optical axis L2 direction, it is required, similarly to the first embodiment, to drive the motor 32 to rotate the lead screw 31 in any one of the positive and negative directions about its axis. In the first nut 63 and the second nut 64 threadably fitted to the male threads 31a of the lead screw 31, the guide grooves 63b and 64b are engaged with the rotation-restricting shaft 13. Therefore, the first nut 63 and the second nut 64 are non-rotatable and can advance and retract in the axial direction of the lead screw 31, and their rotations about the axis of the lead screw 31 are restricted. Therefore, the first nut 63 and the second nut 64 advance and retract in the axial direction along with the rotation of the lead screw 31 while an axial space therebetween is kept substantially constant.

In this case, between the first nut 63 and the second nut 64, the engaging portion 25 of the lens frame 62 and the coil spring 70 are interposed. Further, because the space therebetween is substantially constant as described above, the coil spring 70 is kept compressed. Therefore, the lens frame 62 is biased by the coil spring 70 in the axial direction to thereby press the first nut 63. Therefore, along with the movement of the first nut 63 and the second nut 64 in the axial direction, the lens frame 62 can advance and retract so as to follow the movement. Further, the biasing in the axial direction performed by the coil spring 70 directly acts also on the second nut 64, and is transmitted to the first nut 63. As a result, the first nut 63 and the second nut 64 press the lead screw 31 in the axial direction and are each positioned on one side in the axial direction. Therefore, the first nut 63 and the second nut 64 can advance and retract in the axial direction along with the rotation of the lead screw 31 without generating a backlash in the axial direction. Therefore, the lens frame 62 in contact with the first nut 63 moves along the guide shaft 12 in the optical axis L2 direction while the rotation about the guide shaft 12 is restricted by the rotation-restricting shaft 13. Therefore, the position of the lens 2 fixed to the lens frame 62 can be accurately adjusted in the optical axis L2 direction.

In this case, the coil spring 70 also biases the lens frame 62 about its axis, and the lens frame 62 is restricted in rotation about the guide shaft 12 by the rotation-restricting shaft 13. Therefore, the lens frame 62 always presses by the coil spring 70 the guide shaft 12 and the rotation-restricting shaft 13 in the direction orthogonal to the optical axis L2 direction. This prevents a backlash from being generated in the direction orthogonal to the optical axis L2 direction to thereby enable position adjustment in the optical axis L2 direction of the lens 2 without causing decentering.

As described above, also in the lens driving device 60 according to this embodiment, similarly to the first embodiment, the lens frame 62 can be biased only by the coil spring 70 in the axial direction and about its axis. As a result, the lens frame 62 to which the lens 2 is fixed can be subjected to accurate position adjustment in the optical axis L2 direction with use of the minimum number of components without causing decentering.

Figure 14:
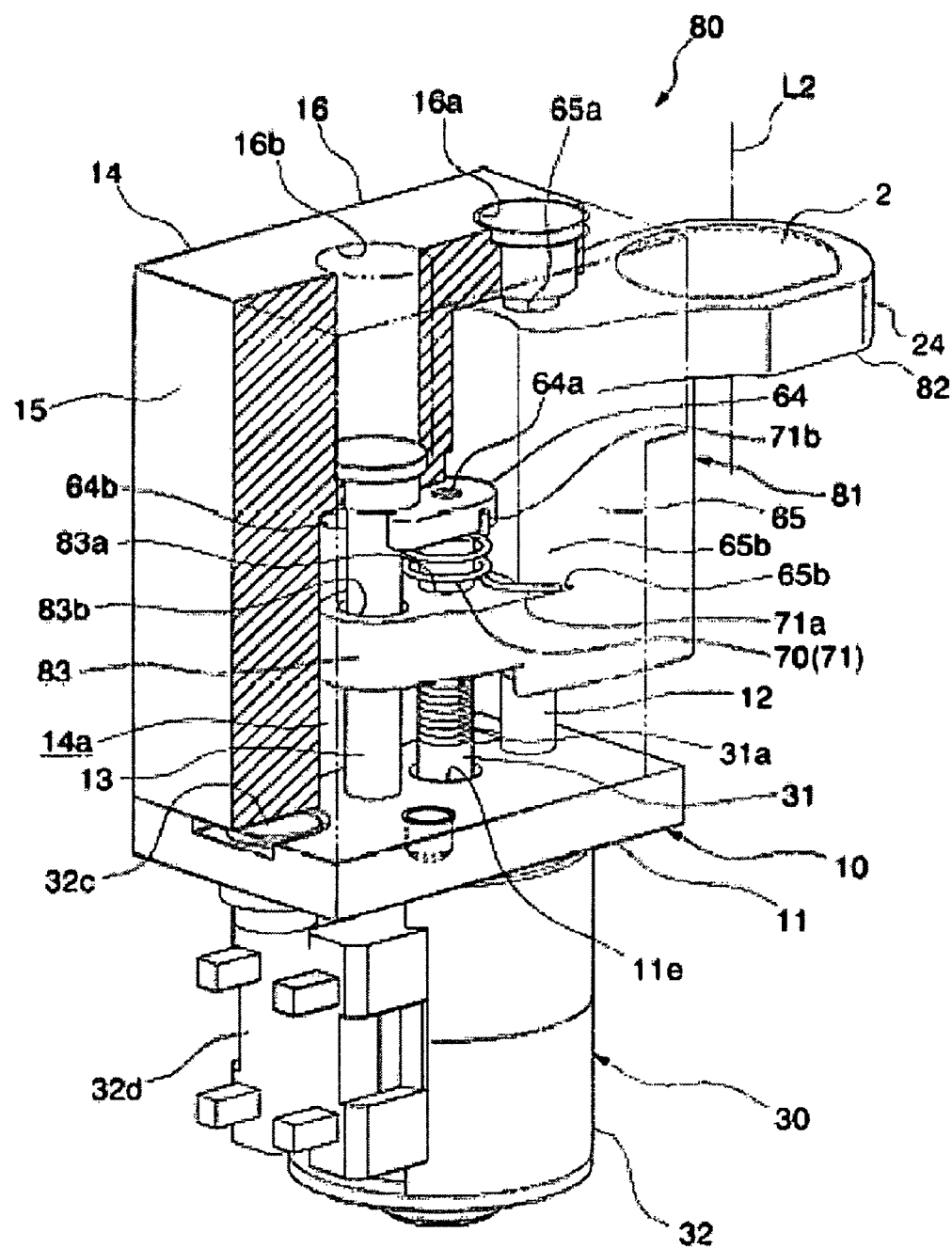
FIG. 14 A partially-cutaway perspective view of a lens driving device of a modification of the second embodiment of the present invention.
Figure 15:
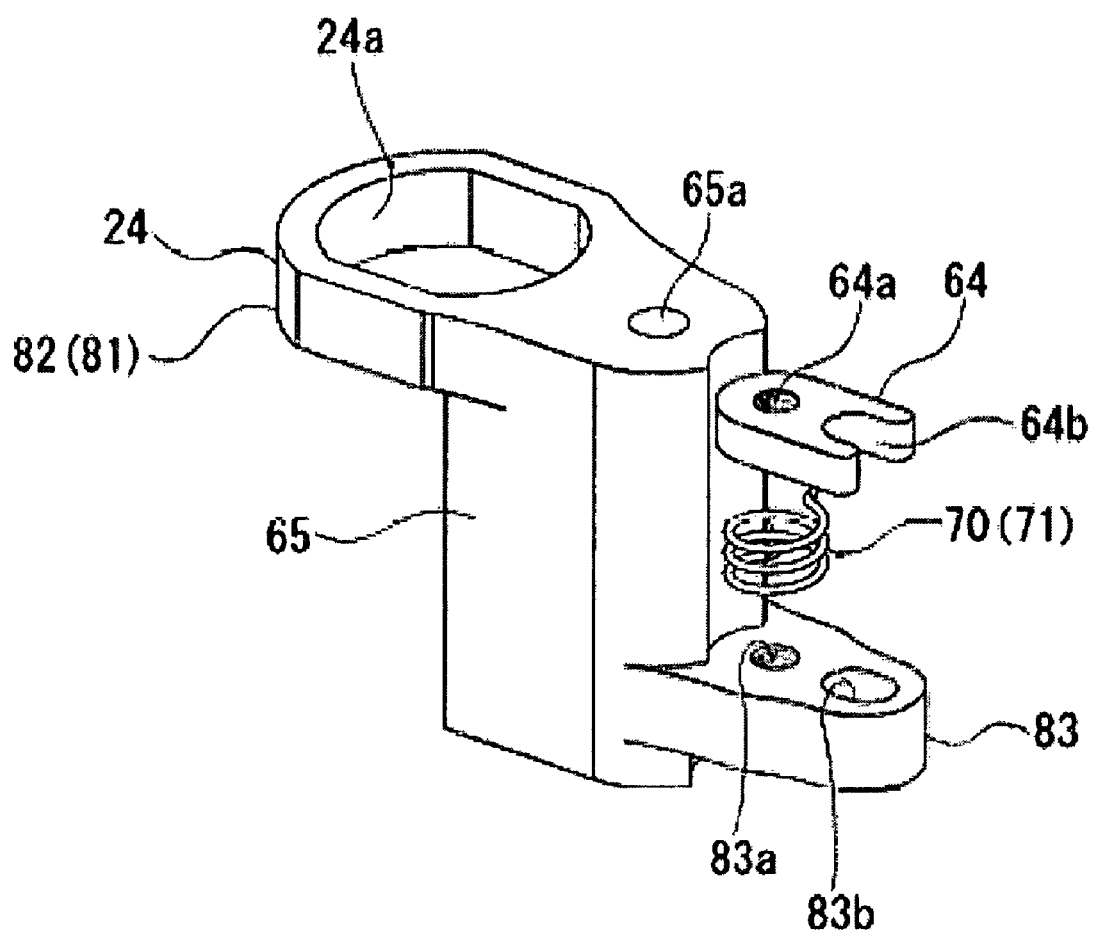
FIG. 15 A perspective view illustrating details of a lens frame in the lens driving device of the modification of the second embodiment of the present invention.
Figure 16:
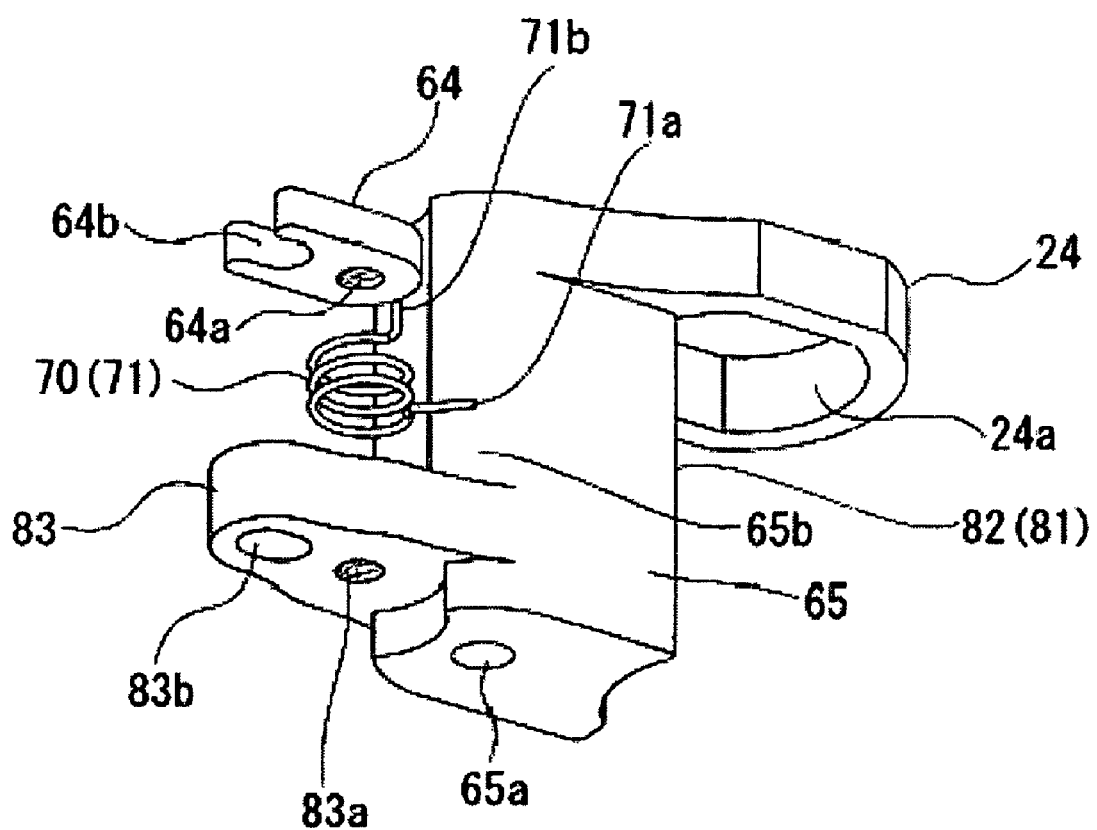
FIG. 16 Another perspective view illustrating details of the lens frame in the lens driving device of the modification of the second embodiment of the present invention.

Note that, similarly to the modification of the first embodiment, the lens frame 62 and the first nut 63 may be integrated together. As illustrated in FIGS. 14 to 16, a lens driving device 80 as a modification of this embodiment is provided with a lens frame 82 constituting a movable system 81, in which a nut portion 83 extending from the guide portion 65 is provided. In the nut portion 83, a screw hole 83a into which the lead screw 31 is threadably fitted is formed, and an engagement hole 83b into which the rotation-restricting shaft 13 is inserted is formed. The inner diameter of the engagement hole 83b is set to be substantially equal to the outer diameter of the rotation-restricting shaft 13 so that the lens frame 82 is restricted in rotation about the guide shaft 12. Further, the coil spring 70 is sandwiched between the nut portion 83 of the lens frame 82 and the nut 64 so as to be compressed. Further, also in the lens driving device 80 of this modification, the coil spring 70 similarly prevents the backlash from being generated in the optical axis L2 direction and the direction orthogonal thereto.

(Third Embodiment)

Figure 17:
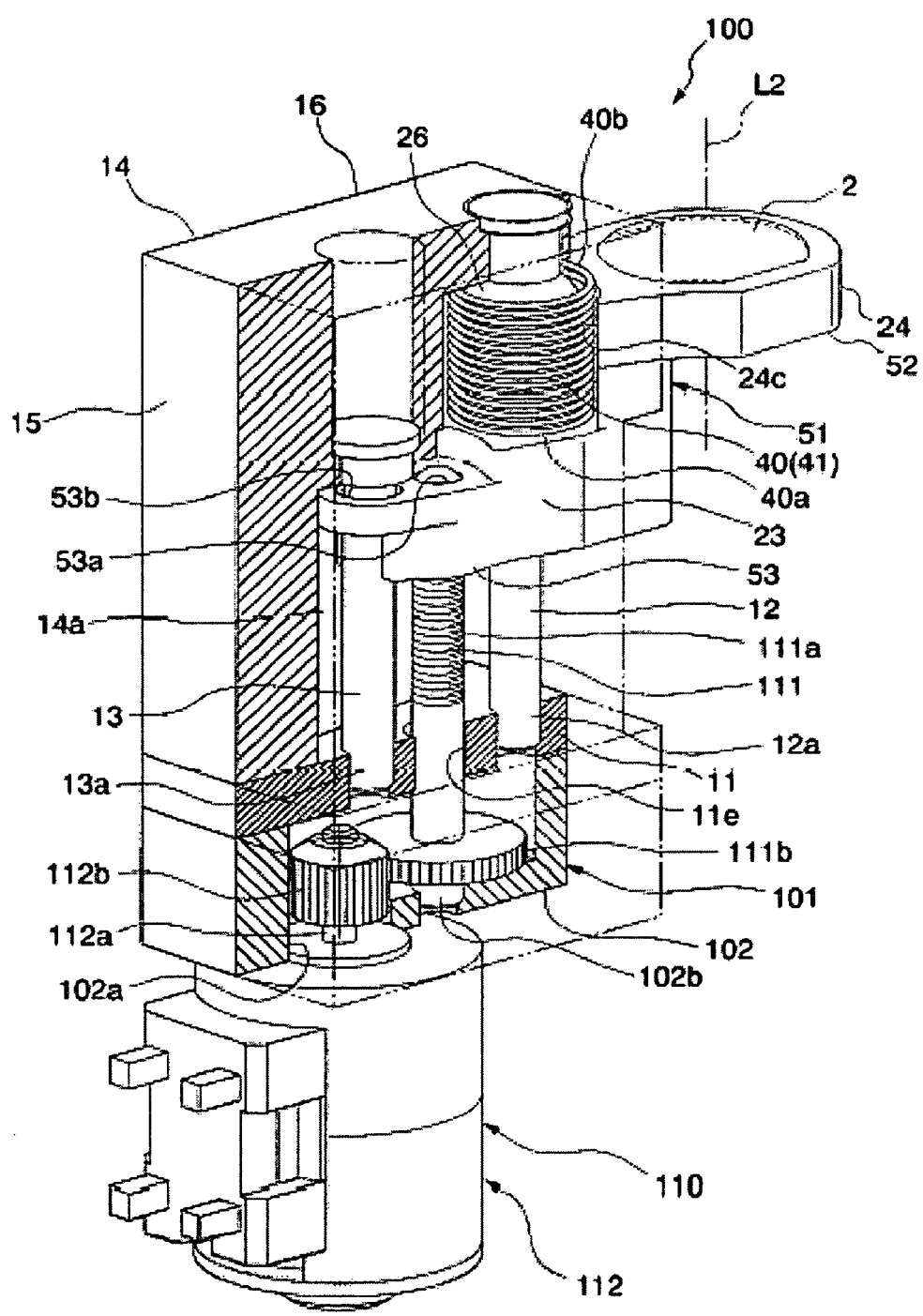
FIG. 17 A partially-cutaway perspective view of a lens driving device according to a third embodiment of the present invention.

Next, a third embodiment of the present invention is described. FIG. 17 illustrates the third embodiment of the present invention. In this embodiment, the members which are the same as those used in the above-mentioned embodiments are denoted by the same reference symbols and the description thereof is omitted.

As illustrated in FIG. 17, a lens driving device 100 according to this embodiment mainly includes: a fixation system 101 including a guide shaft 12 arranged in substantially parallel to the optical axis L2 of a lens 2; a movable system 51, which includes a lens frame 52 to which the lens 2 is fixed and is movable with respect to the fixation system 101; a driving system 110 for moving the movable system 51; and a coil spring 40 serving as a biasing member for biasing the lens frame 52 of the movable system 51. Note that the movable system 51 has the same structure as the movable system according to the modification of the first embodiment, and hence the detailed description thereof is omitted herein.

The fixation system 101 includes a substantially-plate-shaped bottom plate 11, a case 14 fixed to the bottomplate 11, and a substantially-box-shaped gear-housing portion 102 fixed to the bottom plate 11 on the side opposite to the case 14. Further, the driving system 110 includes a lead screw 111 arranged in substantially parallel to the guide shaft 12, and a motor 112 for rotating the lead screw 111.

In the motor 112, a gear 112b is provided to a motor shaft 112a projecting to the outside. The motor 112 is fixed to the gear-housing portion 102, the motor shaft 112a is inserted into a through-hole 102a formed in the gear-housing portion 102, and the gear 112b is arranged in the inside of the gear-housing portion 102. Further, the lead screw 111 is inserted into a through-hole 11e of the bottom plate 11 to project in the housing portion 14a of the case 14 and the gear-housing portion 102. In the lead screw 111, a male thread 111a is formed on the outer peripheral surface of the portion projecting in the housing portion 14a, and the male thread 111a is threadably fitted to the screw hole 53a of the lens frame 52. Further, the lead screw 111 has a proximal end, which is fitted to a bearing 102b formed in the bottom portion of the gear-housing portion 102, and can rotate about its axis. Further, a gear 111b is provided to a portion projecting in the gear-hosing portion 102 of the lead screw 111 so as to be meshed with the gear 112b of the motor 112.

Also by adopting a structure like the lens driving device 100 of this embodiment, in which the gear-housing portion 102 is provided as the fixation system 101 and the lead screw 111 and the motor shaft 112a of the motor 112 are separated from each other, the lens frame 52 to which the lens 2 is fixed can similarly be subjected to accurate position adjustment in the optical axis L2 direction with use of the minimum number of components without causing decentering. Further, even when an installation error occurs in the motor 112, separation between the lead screw 111 and the motor shaft 112a of the motor 112 enables elimination of a fear that the lead screw 111 is affected by the error to thereby become a factor of the backlash.

Figure 18:
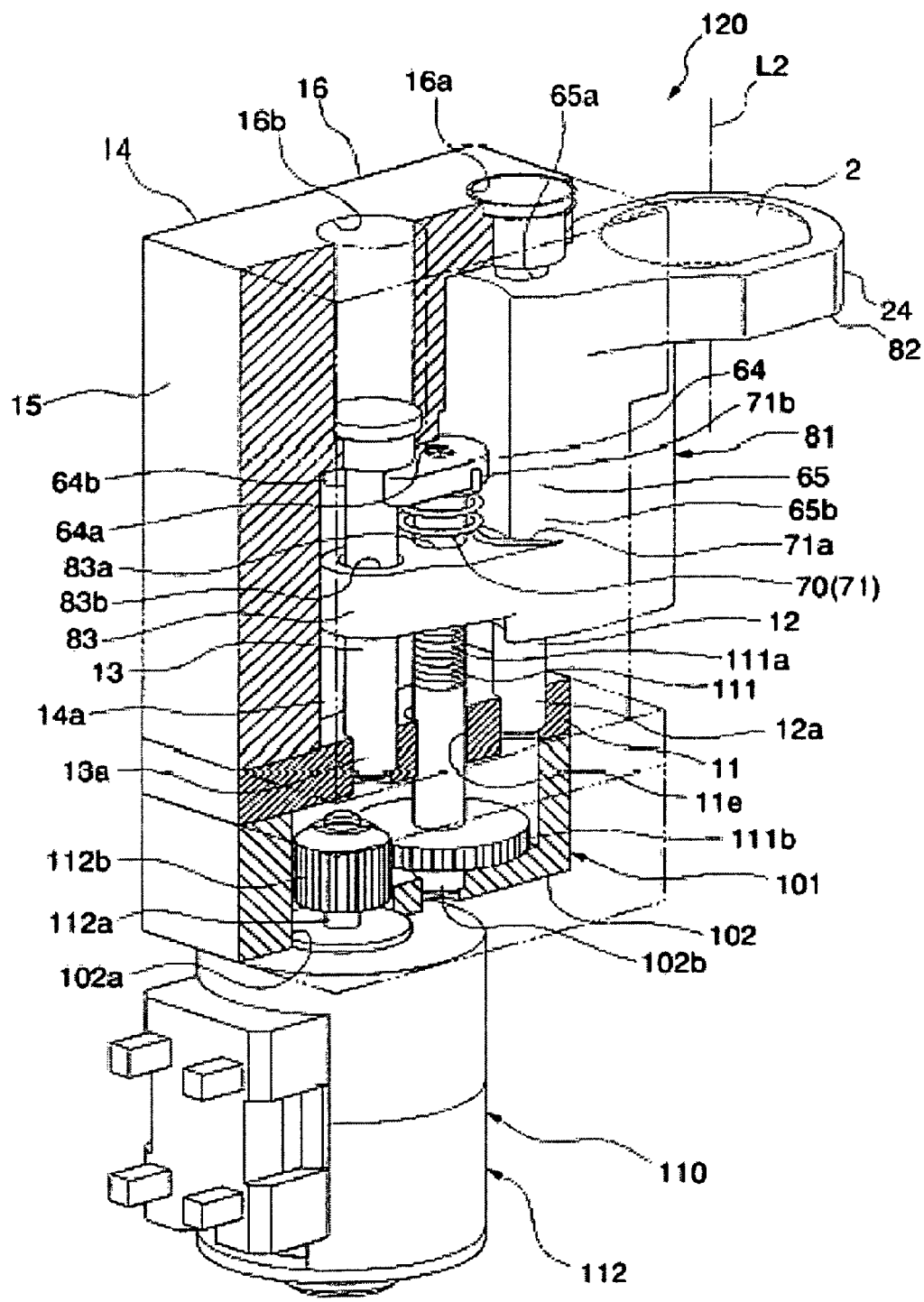
FIG. 18 A partially-cutaway perspective view of a lens driving device of a modification of the third embodiment of the present invention.

Note that, in this embodiment, as a type of the movable system having the lens frame, one corresponding to the modification of the first embodiment is selected. However, one corresponding to the modification of the second embodiment may be selected like a lens driving device 120 of the modification illustrated in FIG. 18.

(Fourth Embodiment)

Figure 19:
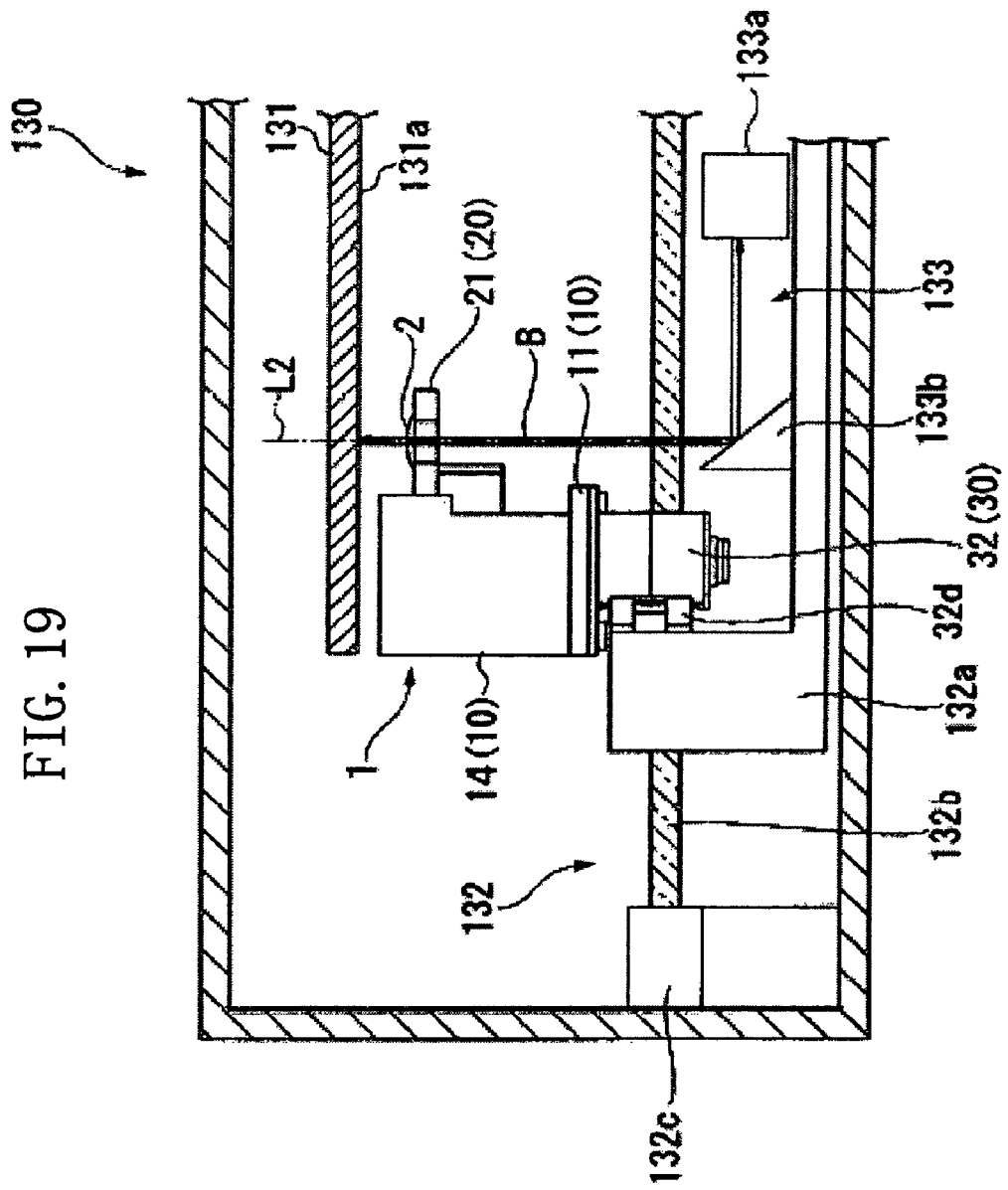
FIG. 19 A sectional view illustrating details of a DVD reading device according to a fourth embodiment of the present invention.

Next, a fourth embodiment of the present invention is described. FIG. 19 illustrates the fourth embodiment of the present invention. In this embodiment, the members which are the same as those used in the above-mentioned embodiments are denoted by the same reference symbols and the description thereof is omitted.

FIG. 19 illustrates, as one example of the electronic device incorporating the lens driving device, the internal structure of a digital versatile disk (DVD) reading device. As illustrated in FIG. 19, a DVD reading device 130 according to this embodiment includes: the lens driving device 1 arranged so as to be opposed to a DVD 131 which can be rotated by a spindle motor (not shown); a moving means 132 for moving the lens driving device 1 in the radial direction of the DVD 131; and a reading means 133 for reading date recorded in the DVD 131. The lens driving device 1 is arranged so that the optical axis L2 direction of the lens 2 fixed to the lens frame 21 becomes substantially orthogonal to a read surface 131a of the DVD 131.

Further, the moving means 132 includes: a supporting member 132a fixed to the fixation member 32d of the motor 32 of the lens driving device 1; a guide screw 132b threadably fitted into a screw hole (not shown) of the supporting member 132a and arranged in the radial direction of the DVD 131; and a driving motor 132c for rotating the guide screw 132b about its axis. Further, when the driving motor 132c is driven to rotate the guide screw 132b, the supporting member 132a is moved along the guide screw 132b according to the rotating direction thereof to thereby enable position adjustment in the radial direction of the lens 2 with respect to the DVD 131.

Further, the reading means 133 includes: a detector 133a for radiating and receiving a laser beam B serving as a detection light; and a mirror 133b, which reflects the laser beam B to cause the laser beam B to pass through the lens 2 as a light substantially parallel to the optical axis L2 so as to cause the light to reflect on the DVD 131, and which reflects the thus reflected light on the detector 133a. The detector 133a and the mirror 133b constituting the reading means 133 are fixed to the supporting member 132a of the moving means 132. Therefore, the detector 133a is moved in the radial direction of the DVD 131 together with the lens driving device 1 so as to radiate the laser beam B at a desired position of the DVD 131 to thereby perform data reading by detecting the reflected light.

In the DVD reading device 130 according to this embodiment, provision of the above-mentioned lens driving device 1 enables accurate position adjustment of the lens 2 in the optical axis L2 direction without decentering the lens 2. In this manner, it is possible to accurately focus the lens 2 to thereby perform data reading.

Note that, though this embodiment exemplifies the DVD reading device as the electronic device, the electronic device is not limited thereto. For example, a camera or a camera-equipped cell phone may be adopted, and the lens driving device of the present invention may be installed for focusing the lens in such camera mechanism. Further, in this embodiment, the lens driving device 1 adopts the structure in which the bottom plate 11 and the case 14 are provided as the fixation system 10 and the motor 32 is fixed to the bottom plate 11. However, other structure may be adopted. For example, it is possible to adopt the structure in which the supporting member 132a itself of the moving means 132 constitutes one component of the fixation system 10, the guide shaft and the rotation-restricting shaft are directly fixed to the supporting member 132a, and the motor 32 and the lead screw may be provided.

Hereinabove, embodiments of the present invention are described with reference to the drawings. However, specific structures are not limited to those of the above-mentioned embodiments, and design and the like may be changed within a range without departing from the gist of the present invention.

The invention claimed is:

1. A lens driving device, comprising:
   a movable system comprising a lens frame to which a lens is fixed, and a non-rotatable threaded nut;
   a fixation system comprising a guide shaft inserted into a guide hole formed in the lens frame to allow the lens frame to advance and retract in an optical axis direction, and a restricting member for restricting rotation of the lens frame about the guide shaft;
   a lead screw rotatable with respect to the fixation system about an axis thereof substantially parallel to the guide shaft, the lead screw having a male thread threadedly engaged with the threaded nut of the movable system;
   a motor for rotating the lead screw about the axis thereof to allow the movable system to advance and retract along the lead screw; and
   a biasing member disposed between the threaded nut and the lens frame for biasing the lens frame in the axial direction and in a direction orthogonal to the axial direction.

2. A lens driving device according to claim 1, wherein the biasing member comprises a coil spring obtained by rolling a coil wire, the coil wire having one end engaged with the lens frame so that the coil wire does not rotate in a positive rotation direction about an axis thereof, and another end engaged with one of the fixation system and a member so that the coil wire does not rotate in a negative rotation direction about the axis thereof, the member being restricted in rotation with respect to the fixation system about an axis thereof substantially parallel to an optical axis.

3. A lens driving device according to claim 1, wherein the movable system includes a non-rotatable threaded member threadedly engaged with the male thread of the lead screw, the biasing member being disposed between the threaded member and the threaded nut.

4. A lens driving device according to claim 3, wherein the threaded member and the threaded nut are axially spaced apart on the lead screw and advance and retract along the lead screw in response to rotation thereof while the axial distance between them is kept substantially constant.

5. A lens driving device according to claim 3, wherein the threaded member comprises a non-rotatable threaded nut.

6. A lens driving device according to claim 3, wherein the threaded member comprises a threaded portion of the lens frame.

7. A lens driving device according to claim 3, wherein the threaded nut and the threaded member each has a groove portion slidable along the restricting member to restrict rotation of the lens frame about the guide shaft as the movable system advances and retracts along the lead screw.

8. A lens driving device, comprising: a threaded lead screw rotatable about its longitudinal axis; first and second threaded members threaded onto the lead screw in axially spaced relation; means for restricting rotation of the first and second threaded members when the lead screw rotates thereby keeping the axial distance between them substantially constant; a motor that rotationally drives the lead screw in forward and reverse directions to advance and retract the first and second threaded members in an axial direction along the lead screws; a lens frame carrying a lens and being coupled to the first and second threaded members to advance and retract therewith along an axis substantially parallel to the axis of the lead screw; and a biasing member located between the first threaded member and the lens frame for elastically biasing the lens frame in both the axial direction and a direction orthogonal to the axial direction.

9. A lens driving device according to claim 8; wherein the first and second threaded members comprise threaded nuts, and the biasing member and a portion of the lens frame are located between the threaded nuts.

10. A lens driving device according to claim 9; wherein the biasing member comprises a coil spring formed of a coil wire, one end of the coil wire engaging with the lens frame to prevent rotation of the coil spring in one direction and the other end of the coil wire engaging with one of the threaded nuts to prevent rotation of the coil spring in the other direction.

11. A lens driving device according to claim 8; wherein the first threaded member comprises a threaded nut and the second threaded member comprises a threaded portion of the lens frame, and the biasing member is located between the threaded nut and the threaded portion of the lens frame.

12. A lens driving device according to claim 11; wherein the biasing member comprises a coil spring formed of a coil wire, one end of the coil wire engaging with the lens frame to prevent rotation of the coil spring in one direction and the other end of the coil wire engaging with the threaded nut to prevent rotation of the coil spring in the other direction.

13. A lens driving device according to claim 8; wherein the biasing member comprises a coil spring formed of a coil wire, one end of the coil wire engaging with the lens frame to prevent rotation of the coil spring in one direction and the other end of the coil wire engaging with one of the threaded members to prevent rotation of the coil spring in the other direction.

14. A lens driving device according to claim 13; wherein the means for restricting rotation comprises a rotation-restricting member extending parallel to and alongside the threaded screw, and groove portions formed in the first and second threaded members and slidable along the rotation-restricting member as the first and second threaded members advance and retract along the lead screw to restrict rotation of the threaded members.

15. A lens driving device according to claim 8; wherein the means for restricting rotation comprises a rotation-restricting member extending parallel to and alongside the threaded screw, and groove portions formed in the first and second threaded members and slidable along the rotation-restricting member as the first and second threaded members advance and retract along the lead screw to restrict rotation of the threaded members.

16. A lens driving device according to claim 15;
further including a guide shaft extending through a guide hole formed in the lens frame to guide the movement lens frame as it advances and retracts.

\* \* \* \* \*